US010449932B2

(12) United States Patent
Schaeuble et al.

(10) Patent No.: US 10,449,932 B2
(45) Date of Patent: Oct. 22, 2019

(54) WIPER DEVICE FOR CLEANING VEHICLE WINDOWS

(71) Applicant: Valeo Systèmes d'Essuyage, Le Mesnil Saint Denis (FR)

(72) Inventors: Michael Schaeuble, Vaihingen/Enz (DE); Kristina Kalmbach, Bietigheim-Bissingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 106 days.

(21) Appl. No.: 15/256,881

(22) Filed: Sep. 6, 2016

(65) Prior Publication Data
US 2017/0066411 A1    Mar. 9, 2017

(30) Foreign Application Priority Data

Sep. 7, 2015 (DE) ......................... 10 2015 114 922

(51) Int. Cl.
*B60S 1/52* (2006.01)
*B60S 1/38* (2006.01)
*B60S 1/40* (2006.01)

(52) U.S. Cl.
CPC ............ *B60S 1/522* (2013.01); *B60S 1/3856* (2013.01); *B60S 1/3863* (2013.01); *B60S 1/4048* (2013.01); *B60S 1/524* (2013.01); *B60S 1/3862* (2013.01); *B60S 2001/4054* (2013.01)

(58) Field of Classification Search
CPC ............................... B60S 1/522; B60S 1/3862
USPC ....................................................... 15/250.04
See application file for complete search history.

(56) References Cited

U.S. PATENT DOCUMENTS 2,432,690 A * 12/1947 Smulski .................... B60S 1/40
                                                          15/250.04
6,658,690 B1 * 12/2003 Westermann ......... B60S 1/4006
                                                          15/250.32
2006/0048329 A1 * 3/2006 Thienard ............... B60S 1/4003
                                                          15/250.32

FOREIGN PATENT DOCUMENTS

DE    102004007351 A1    9/2005
DE    102012224474 A1    7/2014
GB         2356130 A  *  5/2001   ............ B60S 1/4006

OTHER PUBLICATIONS

Search Report Issued in Corresponding German Application No. 10 2014 114 655.7, dated Jul. 6, 2015 (8 Pages).

* cited by examiner

*Primary Examiner* — Andrew A Horton
(74) *Attorney, Agent, or Firm* — Osha Liang LLP

(57) ABSTRACT

The invention relates to a wiper device (10) for cleaning vehicle windows, with a wiper arm (11) and with a wiper blade (12) able to be fastened on the wiper arm (11), with a cleaning device (25), having at least one spray nozzle (44, 45), for spraying a washing fluid, wherein the at least one spray nozzle (44, 45) is arranged in the region of the free end of the wiper arm (11) and is connected directly therewith, and with a fastening device (35) for connecting the wiper blade (12) with the wiper arm (11), wherein the wiper arm (11) has a mount (28), having an at least substantially U-shaped cross section, with two parallel side wall (17, 18) for the fastening device (35) of the wiper blade (12), and wherein the cleaning device (25) is constructed on a component (27) which is separate from the fastening device (35) for the wiper blade (12). It is provided according to the invention that the at least one spray nozzle (44, 45) does not, (Continued)

Figure 1:
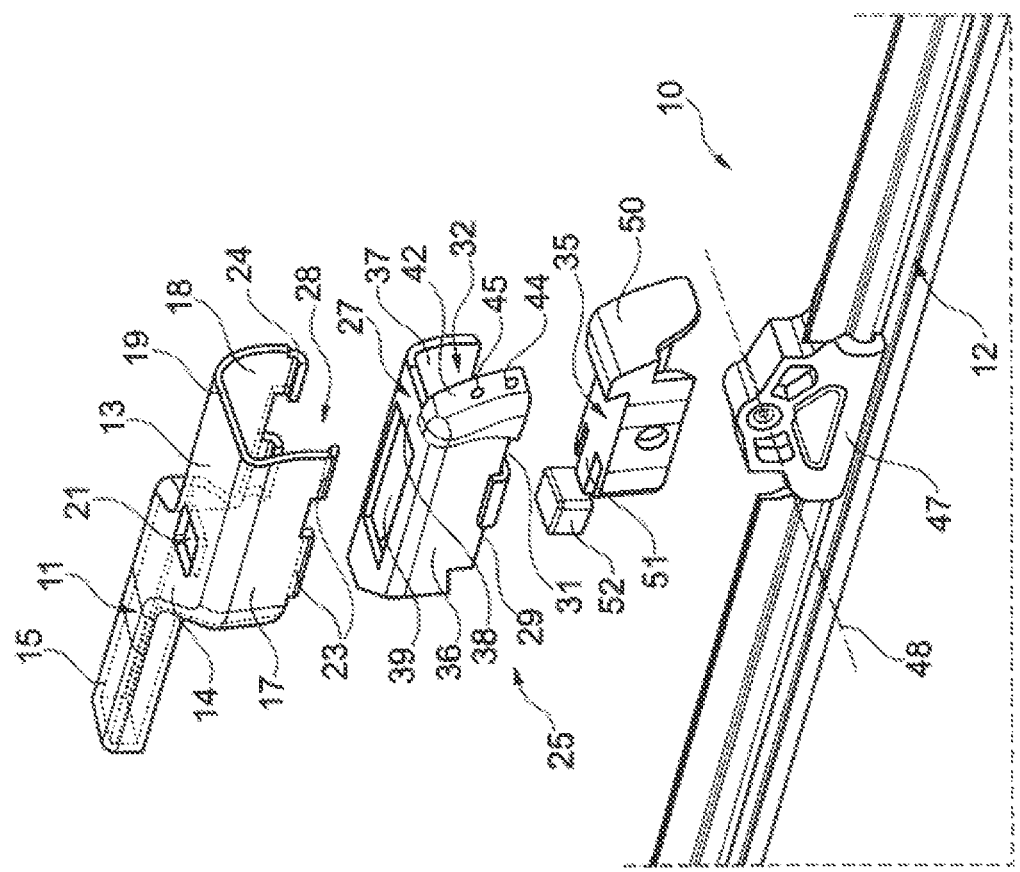

at least laterally, project over the cross-section of the U-shaped mount (28).

18 Claims, 4 Drawing Sheets

WIPER DEVICE FOR CLEANING VEHICLE WINDOWS

PRIOR ART

The invention relates to a wiper device for cleaning vehicle windows as per the preamble of claim 1.

A wiper device as per the preamble of claim 1 is known from DE 10 2004 007 351 A1. In the case of the known wiper device, spray nozzles are provided which are arranged in the region of the wiper arm at the free end of the wiper arm. Furthermore, the wiper arm of the wiper device has a mount which is of substantially U-shaped form and which serves for the fastening of a wiper blade, wherein the wiper blade is connected to the wiper arm by way of a detent device. The spray nozzles of the wiper device project laterally beyond the region of the U-shaped mount of the wiper arm, such that the wiper arm is, in the region of the spray nozzles, of widened form in relation to the region of the mount of the wiper blade. Such a design of the wiper arm, which is widened in relation to a normal wiper arm, for the spray nozzles has not only visual disadvantages but also the characteristic that, in the case of a recessed arrangement of the wiper device in the region of an engine hood, the widening of the wiper arm necessitates a corresponding adaptation of the vehicle body or of the attachment location of the wiper device. Furthermore, in the case of the wiper arm being in the form of a punched/bent part in the region of the mount or of the spray nozzles, this is relatively cumbersome to produce.

DISCLOSURE OF THE INVENTION

Proceeding from the prior art presented, it is the object of the invention to further develop a wiper device for cleaning vehicle windows as per the preamble of claim 1 such that it is made possible to realize a compact design of the wiper device in the region of the spray nozzles. In particular, the width of the wiper arm should not be enlarged in relation to a wiper arm which does not have said spray nozzles.

Said object is achieved according to the invention in the case of a wiper device for cleaning vehicle windows having the features of claim 1 in that the at least one spray nozzle of the cleaning device does not, at least laterally, project over the cross section of the U-shaped mount of the wiper arm.

Advantageous refinements of the wiper device according to the invention for cleaning vehicle windows are specified in the subclaims.

In a preferred design refinement of the separate component that forms the cleaning device, said separate component terminates at least approximately flush with the fastening device (wiper blade adapter) of the wiper blade on the side facing away from the wiper arm.

In particular, in the case of the latter variant, provision is made whereby the separate component and the fastening device form a shared end face on the side facing away from the wiper arm. In this way, the axial structural length of the wiper device is not increased in relation to a wiper device without cleaning device.

In a further advantageous embodiment of the invention, provision is made whereby the separate component of the cleaning device and the fastening device of the wiper blade are arranged at least partially within the mount. In other words, this means that the substantially U-shaped mount of the wiper arm simultaneously serves for receiving the wiper blade and for receiving the cleaning device.

In a further preferred embodiment of the invention, provision is made whereby the separate component of the cleaning device is connected preferably detachably with the mount of the wiper arm. In this way, particularly simple mounting and dismantling of the cleaning device onto/from the wiper arm can be made possible.

In a preferred refinement of the latter proposal, provision is made whereby, in the assembled state of the wiper device, the separate component of the cleaning device is connected detachably with the fastening device of the wiper blade, wherein the connection is constructed so as to be independent of the connection between the separate component of the cleaning device and the mount.

In a further preferred embodiment, provision is made whereby the separate component of the cleaning device has a mount, which is substantially U-shaped in cross section, for the fastening device of the wiper blade, into which the fastening device of the wiper blade is able to be introduced in the direction of the wiper arm, so that in the assembled state of the wiper device, the mount of the separate component of the cleaning device is arranged between the mount of the wiper arm and the fastening device for the wiper blade.

A particularly secure or reliable mount of the fastening device for the wiper blade is realized if the mount of the separate component of the cleaning device has a base and two guide faces arranged thereon parallel to one another, which lie at least partially against side faces of the fastening device of the wiper blade which are parallel to one another in the installed state of the wiper blade on the wiper arm.

For particularly straightforward mounting of the wiper blade on the wiper arm, it is furthermore advantageous if the separate component has guide means for the form-fitting receiving of the fastening device of the wiper blade in a plane running perpendicular to a mounting- or respectively dismantling direction, and if the fastening device of the wiper blade is able to be arrested via a detent connection in the mounting- or respectively dismantling direction on the wiper arm.

In a design refinement of the latter proposal, provision is preferably made whereby the detent connection in the assembled state of the wiper device is guided through an aperture in the base of the mount and is arranged in operative connection with en opening in the mount of the wiper arm.

A particularly good cleaning action of the cleaning device is achieved if at least two spray nozzles are provided with different spray angles, which apply the washing fluid onto different regions and/or on different sides of the wiper blade onto the vehicle window.

A particularly space-saving arrangement in the case of at least two spray nozzles being used is realized if the at least two spray nozzles are arranged one over the other in relation to the wiper blade longitudinal axis. Such an arrangement has the advantage in particular that the width of the mount on the wiper arm can be made relatively narrow.

In a further preferred geometric embodiment, provision is made whereby the fastening device has on the side facing away from the wiper arm an end face which continues in a surface-flush manner into the end face of the spray nozzle.

Further advantages, features and details of the invention will emerge from the following description of preferred exemplary embodiments on the basis of the drawing.

Figure 2:
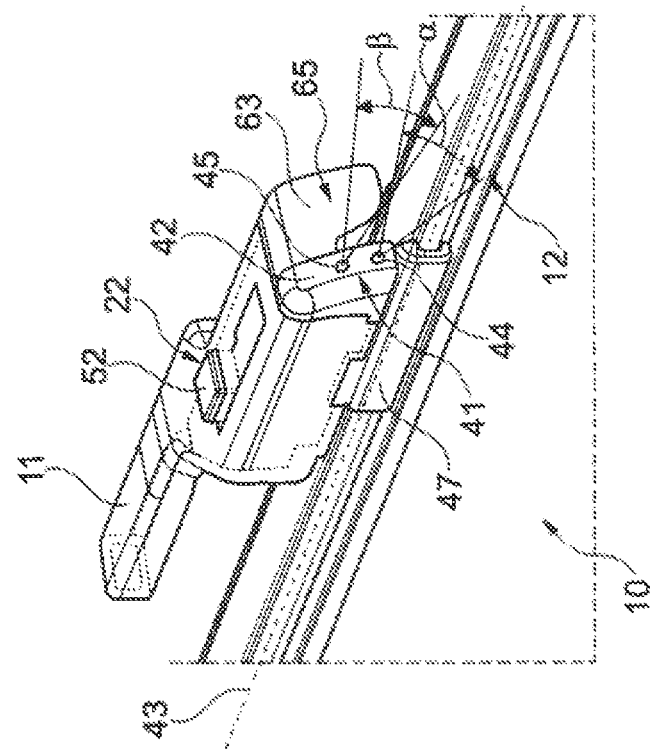
Figure 3:
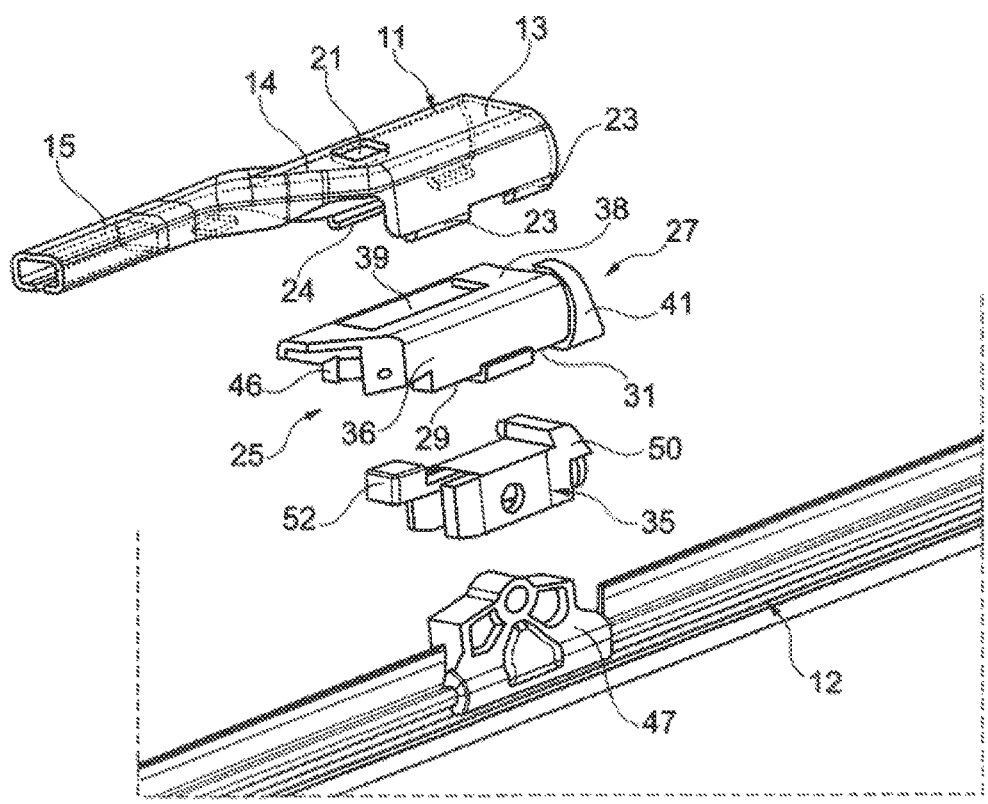
Figure 4:
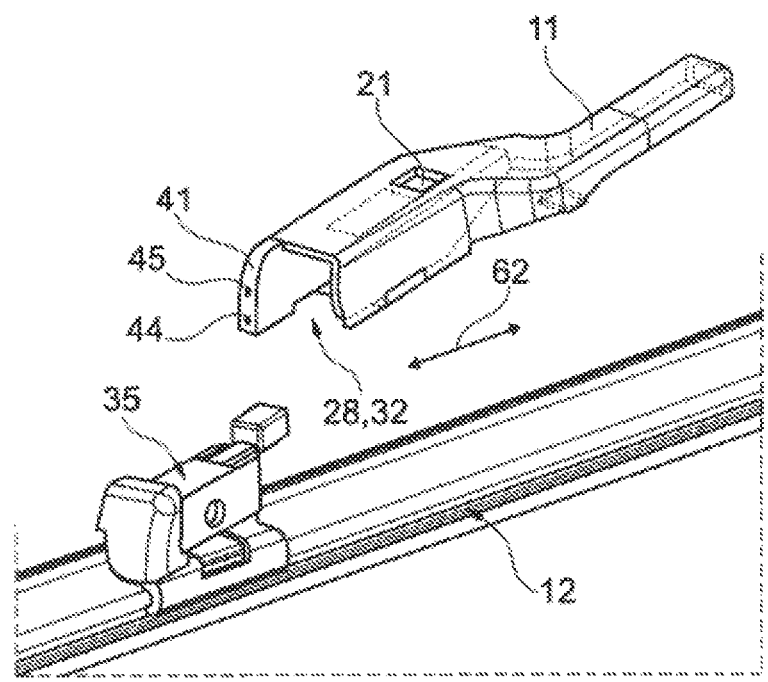
Figure 5:
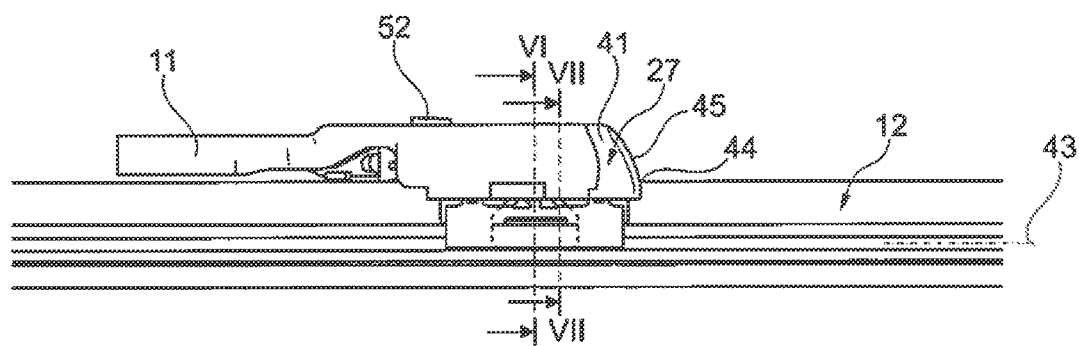

In the drawing:

FIG. 1 shows a wiper device according to the invention, composed of a wiper arm with a wiper blade fastened thereto, in a perspective illustration, FIG. 2 shows the individual parts of the wiper device according to the invention as per FIG. 1 in an exploded illustration, FIG. 3 shows the constituent parts of the wiper device as per FIG. 2 in a different view in relation to FIG. 2, likewise in an exploded illustration, FIG. 4 shows a wiper arm and a wiper blade of the wiper device as per FIGS. 1 to 3 in the mutually separated state in a perspective view, FIG. 5 shows a side view of the wiper device as per FIG. 1 in the assembled state, and

FIG. 6 and

Figures 6, 7:
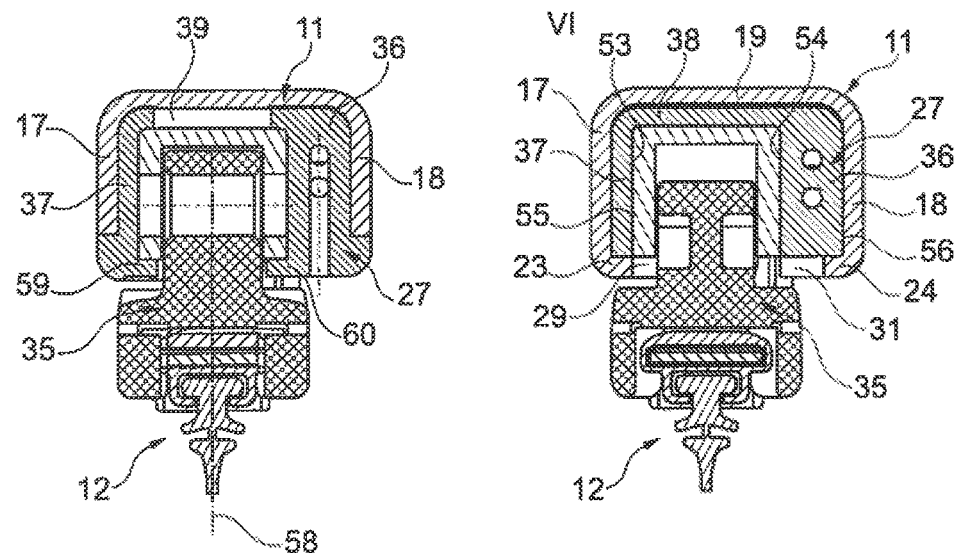

FIG. 7 show a cross section in the planes VI-VI and VII-VII respectively in FIG. 5.

Identical elements or elements of identical function are denoted in the figures by the same reference designations.

The wiper device 10 according to the invention illustrated in the figures serves for cleaning a vehicle window (not illustrated). The wiper device 10 comprises a wiper arm 11 and a wiper blade 12 which is fastened exchangeably to the wiper arm 11 at a free end of the wiper arm 11. The wiper arm 11 has, on the side facing toward the wiper blade 12, a first section 13 which is of substantially as rectilinear form. The first section 13 continues over a second section 14, which runs obliquely relative to the first section 13, into a third section 15 arranged parallel to the first section 13, which third section, on the side facing away from the wiper blade 12, is arranged so as to be connected at least indirectly to a wiper motor for the actuation of the wiper blade 12 or of the wiper arm 11.

The first section 13 of the wiper arm 11, which serves for receiving the wiper blade 12, has a substantially U-shaped cross section with two parallel side walls 17, 18 and with a base 19 which connects the two side was 17, 18. By way of example, in the region of the base 19, there is formed a rectangular cutout 21 as a constituent part of a detent connection 22 for the detachable fastening of the wiper blade 12 to the wiper arm 11. On those sides of the two side was 17, 18 of the first section 13 which face away from the base 19, fastening tugs 23, 24 which are bent inward through approximately 90° are formed on the wiper arm 11, which is preferably composed of sheet metal. At least substantially within the wiper arm 11, the wiper device 10 furthermore has a cleaning device 25 for applying a cleaning liquid to the vehicle window.

The cleaning device 25 has a separate component 27 which is connected to the wiper arm 11 and which is preferably in the form of an injection-moulded part and which is arranged within the mount 28 of the wiper arm 11, said mount being formed by the U-shaped cross section of the first section 13 of the wiper arm 11. For this purpose, the fastening lugs 23, 24 on the two side was 17, 18 engage with corresponding cutouts 29, 31 which are formed on the component 27.

The component 27 likewise has a substantially U-shaped cross section with a further mount 32 for receiving a fastening device 35 in the form of a wiper blade adapter of the wiper blade 12. For this purpose, the component 27 has two side walls 36, 37 for forming the further mount 32, and has a base section 38 which connects the two side walls 36, 37. An aperture 39 is formed, so as to at least overlap the cutout 21, in the base section 38. The component 27 is arranged in formfitting fashion within the mount 28 of the wiper arm 11 and is connected by way of the fastening lugs 23, 24 to the wiper arm 11. On that end face of the first section 13 which faces away from the third section 15 of the wiper arm 11, a subsection 41 of the component 27 projects out of the first section 13 of the wiper arm 11.

Two spray nozzles 44, 45, arranged one over the other in relation to a wiper blade longitudinal axis 43, are arranged, as constituent parts of the cleaning device 25, on the end face 42 of the subsection 41 in the region of one side wall 36. The spray nozzles 44, 45 may, as can be seen in particular from FIG. 1, be oriented with different spray angles α, β relative to the wiper blade longitudinal axis 43 in order to make it possible for the cleaning liquid to be applied to different regions of the vehicle window or on different sides of the wiper blade 12. It can also be seen from the figures that the spray nozzles 44, 45 do not laterally project over the cross section of the section 13 of the wiper arm 11 or of the mount 28 thereof.

Within the wiper arm 11 there is arranged a supply line (hose) (not illustrated) for the cleaning liquid, which supply line is connectable, on that side of the component 27 which is averted from the spray nozzles 44, 45, to a connection piece 46 which can be seen in FIG. 3.

The further mount 32 of the component 27 serves for the detachable fastening of the fastening device 35 of the wiper blade 12. As can be seen in particular from FIGS. 2 and 3, the fastening device 25 has a first element 47, which is fixedly connected to the wiper blade 12, and a second element 50, which is connected to the first element 47 at an axis of rotation 48. The second element 50, which is preferably in the form of a plastics injection-moulded part, has, on its top side, a detent button 52 which is fastened integrally by way of a spring tongue 51 and which, in the mounted state of the wiper blade 12 on the wiper arm 11, can be arrested in the cutout 21 of the wiper arm 11 having passed through the aperture 39 of the component 27. The second element 50, which is received in form-fitting fashion substantially within the further mount 32 of the component 27, has two side surfaces 63, 54 which are arranged parallel to one another and which, in the installed state, bear in form fitting fashion against guide surfaces 55, 56 of the further mount 32 of the component 27 (FIG. 7). As can be seen in particular from FIG. 6, the component 27 furthermore has two guide means which project, relative to a wiper blade plane 58, in the direction of the wiper blade plane 58 and which are in the form of guide webs 59, 60 which, during mounting and dismantling of the wiper blade 12 on or from the wiper arm 11, enter into operative connection with the underside of the second element 50 in order to permit mounting and dismantling of the wiper blade 12 in the direction of the double arrow 62.

As can be seen particularly clearly from FIG. 1, the face side 42 of the component 27 forms a shared end face 65 together with an end face 63 of the second element 50, wherein the end face 63 of the second element 50 continues in a surface-flush manner into the and face 42 of the component 27.

During the mounting and dismantling of the wiper blade 12 on and from the wiper arm 11, only the fastening device 35 with its second element 50 is inserted into the further recess 32 of the component 27, whereas the cleaning device 25 remains static within the wiper arm 11. The arresting of the wiper bade 12 in the wiper blade longitudinal direction 43 is realized by way of the detent button 52 on the second element 50, by virtue of said detent button engaging through the aperture 39 of the component 27 and engaging into the cutout 21 of the first section 13 of the wiper arm 11.

The wiper device 10 thus described may be altered or modified in a variety of ways without departing from the concept of the invention. In particular, it is conceivable for either a smaller number or a greater number of spray nozzles 44, 45 to be formed on the component 27. Also, it is not the intention for the invention to be restricted to the at least one spray nozzle 44, 45 being arranged or formed only on one side wall 36 of the component 27. Rather, it is also conceivable for such spray nozzles 44, 45 to be arranged or formed on both side walls 36, 37.

LIST OF REFERENCE DESIGNATIONS

10 Wiper device
11 Wiper arm
12 Wiper blade
13 First section
14 Second section
15 Third section
17 Side wall
18 Side wall
19 Base
21 Cutout
22 Detent connection
23 Fastening lug
24 Fastening lug
25 Cleaning device
27 Component
28 Mount
29 Cutout
31 Cutout
32 Mount
35 Fastening device
36 Side wall
37 Side wall
38 Base section
39 Aperture
41 Subsection
42 End face
43 Wiper blade longitudinal axis
44 Spray nozzle
45 Spray nozzle
46 Connection piece
47 Element
48 Axis of rotation
50 Second element
51 Spring tongue
52 Detent button
53 Side lace
54 Side face
55 Guide face
56 Guide surface
58 Wiper blade plane
59 Guide web
60 Guide web
62 Double arrow
63 End face
65 End face
α Spray angle
β Spray angle

The invention claimed is:

1. A wiper device for cleaning vehicle windows, comprising:
 a wiper arm;
 a wiper blade fastened on the wiper arm via a fastening device;
 a cleaning device, comprising a supporting part, and a spraying part having at least one spray nozzle for spraying a washing fluid; and the fastening device being separate from the wiper arm and separate from the cleaning device, and being for connecting the wiper blade with the wiper arm,
wherein the wiper arm has a mount, having an open front end with an at least substantially U-shaped cross section, with two parallel side walls for mounting the cleaning device, wherein the at least substantially U-shaped cross section is orthogonal to a longitudinal direction of the wiper arm,
wherein the spraying part is constructed on the supporting part which is separate from the fastening device for the wiper blade,
wherein the supporting part of the cleaning device is mounted into the at least substantially U-shaped cross section of the wiper arm,
wherein the supporting part of the cleaning device has an additional mount, which is substantially U-shaped in cross-section and parallel to the at least substantially U-shaped cross section of the wiper arm, and has two supporting part side walls connected via a base section and parallel to the two parallel side walls of the wiper arm, and
wherein the spraying part of the cleaning device is carried longitudinally on one end of the supporting part in such a way
 that the spraying part of the cleaning device extends longitudinally beyond the open front end of the wiper arm, and
 that the fastening device, being separate from the cleaning device, is disposed between the wiper blade and the at least one spray nozzle of the cleaning device, and is mounted within the two supporting part side walls and the base section of the additional mount.

2. The wiper device according to claim 1,
wherein the supporting part of the cleaning device terminates at least approximately flush with the fastening device on a side facing away from the wiper arm.

3. The wiper device according to claim 2,
wherein the supporting part of the cleaning device and the fastening device form a shared end face on the side facing away from the wiper arm.

4. The wiper device according to claim 2, wherein the supporting part of the cleaning device has an end face on the side facing away from the wiper arm, in which end face the at least one spray nozzle is arranged.

5. The wiper device according to claim 4, wherein the fastening device has on the side facing away from the wiper arm an end face, which continues in a surface-flush manner into the end face of the at least one spray nozzle.

6. The wiper device according to claim 1, wherein the at least one spray nozzle is arranged on a side facing away from the wiper arm outside the mount for the fastening device.

7. The wiper device according to claim 1, wherein the supporting part of the cleaning device and the fastening device are arranged at least partially within the mount.

8. The wiper device according to claim 1, wherein the supporting part of the cleaning device is connected detachably with the mount.

9. The wiper device according to claim 8, wherein in the assembled state of the wiper device, the supporting part of the cleaning device is connected detachably with the fastening device, wherein the connection is constructed so as to be detachable independently of the connection between the supporting part of the cleaning device and the mount.

10. The wiper device according to claim 8, wherein the supporting part of the cleaning device has a mount, which is substantially U-shaped in cross-section, for the fastening device, into which the fastening device is able to be introduced in the direction of the wiper arm, so that in the assembled state of the wiper device, the mount of the supporting part of the cleaning device is arranged between the mount of the wiper arm and the fastening device.

11. The wiper device according to claim 10, wherein the mount of the supporting part of the cleaning device has a base and two guide faces arranged thereon, parallel to one another, which lie at least partially against side faces of the fastening device which are parallel to one another in the installed state of the wiper blade on the wiper arm.

12. The wiper device according to claim 10, wherein the supporting part of the cleaning device has at least one guide face for the form-fitting receiving of the fastening device in a plane running perpendicular to a mounting or respectively dismantling direction and that the fastening device is able to be arrested via a detent connection in the mounting or respectively dismantling direction on the wiper arm.

13. The wiper device according to claim 12, wherein the detent connection in the assembled state of the wiper device is guided through an aperture in the base of the mount of the wiper arm and is arranged in operative connection with an opening in the mount of the wiper arm.

14. The wiper device according to claim 1, wherein the at least one spray nozzle comprises a first spray nozzle and a second spray nozzle that are provided with different spray angles, which apply the washing fluid onto different regions and/or on different sides of the wiper blade onto the vehicle window.

15. The wiper device according to claim 14, wherein the at least two spray nozzles are arranged one over the other in relation to a wiper blade longitudinal axis.

16. The wiper device according to claim 1, in the region of the mount, the wiper arm forms a first section, which continues over an obliquely-running second section into a third section running parallel to the first section, and that the second section in the transition region from the first section runs laterally flush with the first section.

17. A wiper device for cleaning vehicle windows, comprising:
a wiper arm;
a wiper blade fastened on the wiper arm via a fastening device;
a cleaning device, comprising a supporting part, and a spraying part having at least one spray nozzle for spraying a washing fluid; and
the fastening device separate from the wiper arm and for connecting the wiper blade with the wiper arm,
wherein the wiper arm has a mount, having an open front end with an at least substantially U-shaped cross section, with two parallel side walls for the fastening device of the wiper blade,
wherein the spraying part is constructed on the supporting part which is separate from the fastening device for the wiper blade,
wherein the supporting part of the cleaning device is mounted into the at least substantially U-shaped cross section of the wiper arm,
wherein the fastening device has a connector element, which is fixedly connected to the wiper blade, and an adaptor element separate from the connector element, which is connected to the connector element at an axis of rotation, and
wherein the at least one spray nozzle of the cleaning device is disposed between the connector element, fixedly connected to the wiper blade, and the wiper arm.

18. A wiper device for cleaning vehicle windows, comprising:
a wiper arm;
a wiper blade fastened on the wiper arm via a fastening device;
a cleaning device, comprising a supporting part, and a spraying part having at least one spray nozzle for spraying a washing fluid; and
the fastening device separate from the wiper arm and for connecting the wiper blade with the wiper arm,
wherein the wiper arm has a mount, having an open front end with an at least substantially U-shaped cross section, with two parallel side walls for the fastening device of the wiper blade,
wherein the cleaning device is constructed on the supporting part which is separate from the fastening device for the wiper blade,
wherein the supporting part of the cleaning device is mounted into the at least substantially U-shaped cross section of the wiper arm and connected detachably with the wiper arm mount, with the spraying part of the cleaning device extending longitudinally beyond the open front end of the wiper arm,
wherein the supporting part of the cleaning device has a second mount, which is substantially U-shaped in cross-section, into which the fastening device is introduced in the direction of the wiper arm, so that in the assembled state of the wiper device, the second mount is arranged between the mount of the wiper arm and the fastening device,
wherein the supporting part of the cleaning device has at least one guide face for the form-fitting receiving of the fastening device in a plane running perpendicular to a mounting or respectively dismantling direction, and the fastening device is arrested via a detent connection in the mounting or respectively dismantling direction on the wiper arm, and
wherein the detent connection, in the assembled state of the wiper device, is guided through an aperture in a base of the mount of the wiper arm and is arranged in operative connection with an opening in the mount of the wiper arm.

* * * * *